C. CUTLER.
Bee Hive.
No. 32,357.
Patented May 21, 1861.
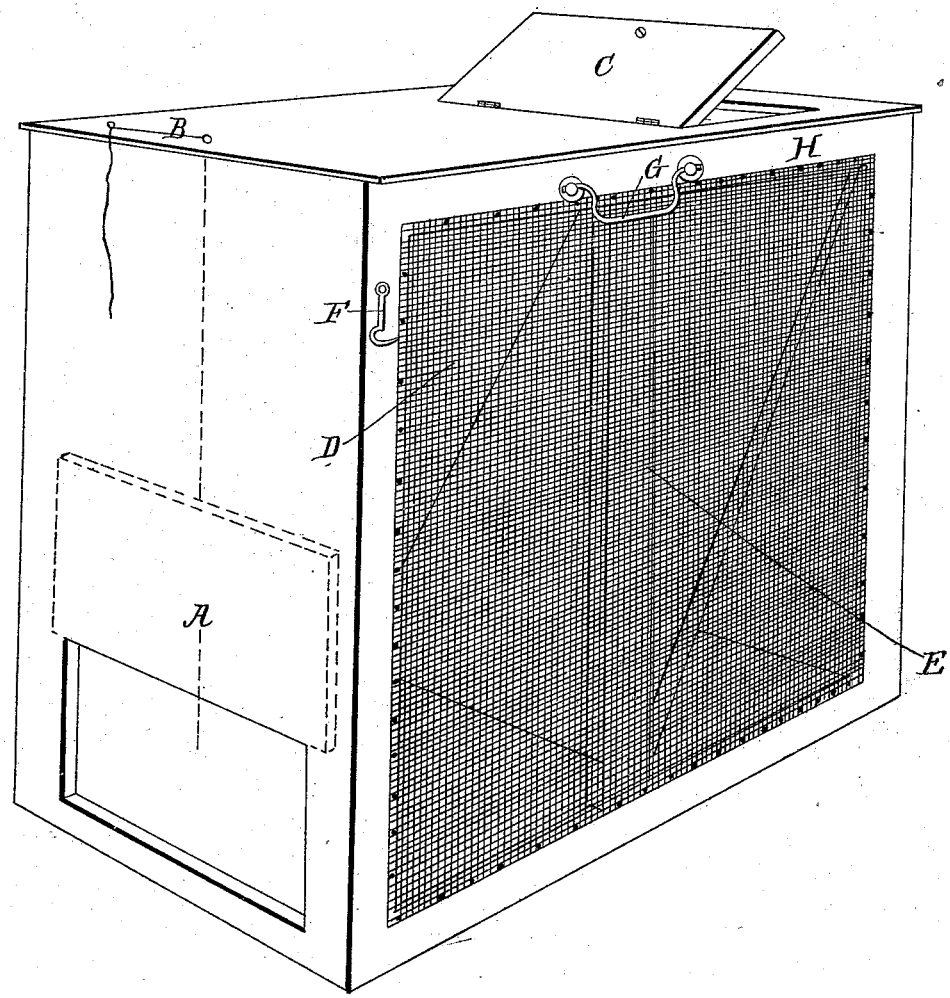
Witnesses.
P. G. Kent
S. G. Johnson
Inventor
Calvin Cutler

UNITED STATES PATENT OFFICE.

CALVIN CUTLER, OF TONAWANDA, NEW YORK.

DEVICE FOR HIVING BEES.

Specification of Letters Patent No. 32,357, dated May 21, 1861.

*To all whom it may concern:*

Be it known that I, CALVIN CUTLER, of Tonawanda, in the county of Erie, in the State of New York, have invented a new Mode of Hiving the Honey-Bee; and I do hereby declare that the following is a full and exact description thereof, reference being had to the accompanying drawings and to the letters of reference marked thereon.

The nature of my invention consists in a small frame called a "swarm catcher."

To enable others skilled in the art to make and use my invention, I will proceed to describe its construction and operation.

The size of the frame is two feet long, one and a half feet high, and one foot and two inches wide, framed as follows: The sides are composed of one top and one bottom rail two inches wide and one inch thick, and three upright pieces the same size, one at each end and one in the middle, forming two open panels. One end of the swarm catcher is left open same as the sides. The other end is inclosed with wood having a sliding door shown by the letter, A, on the drawing and opened or shut by means of a string passing through the top marked letter B. The bottom is of wood. The top is also wood with a small door, as shown by letter C. The open part of the frame is enveloped in wire gauze or netting fine enough to prevent the bees from escaping and to admit light. The sloping pieces inside marked D and E are to prevent the bees from lodging in the corners. The hooks in the end marked F are for fastening the swarm catcher to the bee hive. The handles, marked G, are for lifting it by.

The plan of operating it is as follows: As soon as a swarm of bees is ready to come from the hive I fasten the swarm catcher to it by means of the hooks F into staples in the hive. I then place an empty hive on the top and open the slide door in the end by the string; and open the door on the top by a knob as seen in the drawings, which allows the bees to pass from the old hive through the swarm catcher into the new hive, thus preventing the possibility of losing the young queens, which sometimes cannot fly, and fall in the grass and perish. I also regulate the size of my swarms by closing the door A, when I think the swarms large enough, and remove the swarm catcher; and other bees that may come out after that will return to the old hive, and when two or more swarms come out at one time they are likely to alight together and by the use of my swarm catcher they are kept separate.

What I claim is—

The above described swarm-catcher when attached to a bee-hive, and constructed and operating in the manner, and for the purpose set forth.

CALVIN CUTLER.

Witnesses:
S. G. JOHNSON,
A. G. KENT.